(No Model.)
J. K. BEACH.
SHUTTER FOR PHOTOGRAPHIC APPARATUS.
No. 339,840. Patented Apr. 13, 1886.
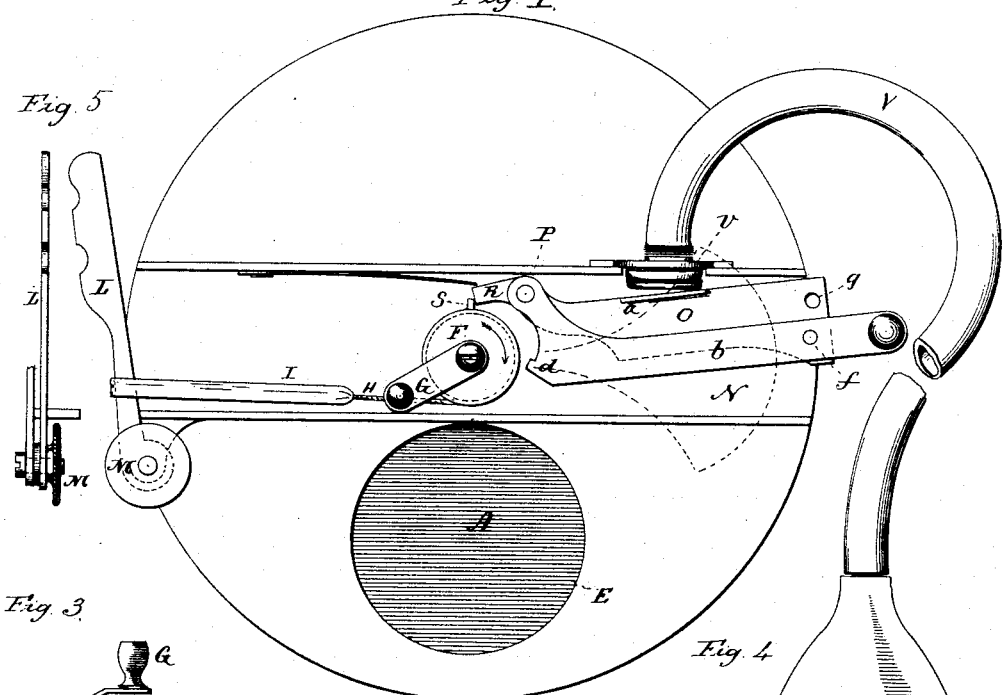
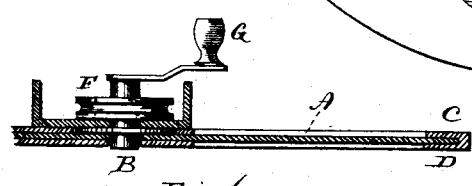
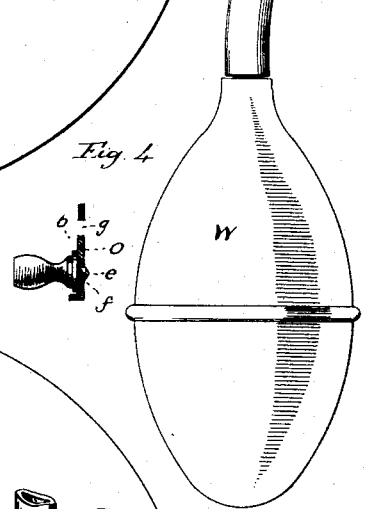
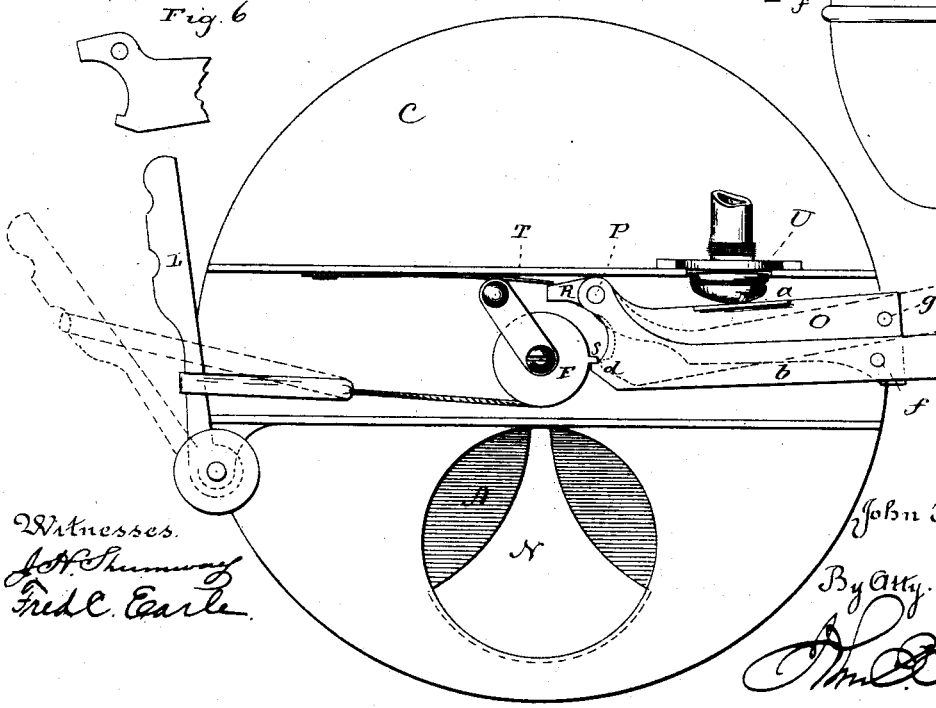
Witnesses．　　　　　　　　　　　John K. Beach, Inventor

UNITED STATES PATENT OFFICE.

JOHN K. BEACH, OF NEW HAVEN, CONNECTICUT.

SHUTTER FOR PHOTOGRAPHIC APPARATUS.

SPECIFICATION forming part of Letters Patent No. 339,840, dated April 13, 1886.

Application filed October 19, 1885. Serial No. 180,275. (No model.)

*To all whom it may concern:*

Be it known that I, JOHN K. BEACH, of New Haven, in the county of New Haven and State of Connecticut, have invented a new Improvement in Shutters for Photographic Apparatus; and I do hereby declare the following, when taken in connection with accompanying drawings and the letters of reference marked thereon, to be a full, clear, and exact description of the same, and which said drawings constitute part of this specification, and represent, in—

Figure 1, a front view showing the shutter as set preparatory to opening the exposure; Fig. 2, the same view showing the shutter as having been tripped to release it from the position in Fig. 1 and caught at the intermediate position when the shutter-aperture is coincident with the exposure-opening; Fig. 3, a horizontal section through the shutter, showing the axis on which the shutter is hung; Fig. 4, a vertical section through the latch, showing the device for engaging the two parts; Fig. 5, a side view, looking toward the spring-adjusting lever; Fig. 6, a modification of the latch.

This invention relates to an improvement in devices for operating the shutter in photographic apparatus, designed for instantaneous work, the object being to adapt the shutter to an instantaneous movement across the opening or to detain it in a position to expose the opening for any desired time, as may be required for different classes of work; and the invention consists in a shutter arranged to rotate in a plane parallel with and across the exposure-opening, the said shutter having an aperture through it, which, under rotation, passes over the opening, combined with a latch mechanism adapted to hold the shutter in the closed position, release it, and permit it to turn across the opening for instantaneous exposure or interrupt the rotation of the shutter for a longer exposure, as occasion may require.

A represents the shutter, which is hung upon an axis, B. It is preferably arranged between two disks, C D, and with which the shutter is concentric, and through the disks is the usual opening, E, through which the plate is exposed. The axis B is supported in bearings, the shutter being made fast to it and so as to rotate therewith.

To the axis B a pulley, F, is fixed, and also a crank-like handle, G, by which the shutter may be turned. Around the pulley is a cord, H, one end fixed to the pulley, the other to a spring, I, the tendency of the spring being to turn the pulley and the shutter in the direction indicated by the arrow. The spring is represented as hung by its fixed end to a lever, L, the said lever being adjustable, as indicated in Fig. 2, so as to give greater or less tension to the spring, the spring held in any position to which it may be adjusted by a set-screw, M, and so that the power to rotate the spring may be increased or diminished, as required, to give a quicker or slower rotation to the shutter. The shutter is constructed with an aperture, N, as seen in Fig. 2, and also shown in broken lines at N, Fig. 1.

O is a latch hung upon a pivot, P, its nose R extending therefrom over the pulley F. The pulley is provided with a projection or shoulder, S, with which the nose R of the latch O may engage, as indicated in Fig. 1, and in that position the spring is under its strongest tension, and so that if the latch O be depressed to raise the nose R, as seen in Fig. 2, from its engagement with the shoulder or stop S the spring is free to act, and the pulley will be rotated in the direction indicated by the arrow and carry with it the shoulder.

T is a spring arranged to bear upon the nose R to turn it toward the pulley or stop when free.

Above the latch O is an elastic bulb or follower, U, adapted to expand or move downwardly under pneumatic pressure. To this follower a tube, V, leads from an air-bulb, W, by the compression of which air will be forced into the follower U to depress the follower, as indicated in Fig. 2, the operation of this bulb being substantially the same as that in similar devices. The latch is provided with a bearing-surface, a, upon which the follower will operate, so that when the follower is forced downward, as seen in Fig. 2, it will depress the latch O, as indicated in that figure, and so as to turn the nose R out of the path of the shoulder S. On the same pivot, P, is a second latch, b, constructed with a nose, d, adapted to come into the path of the shoulder S, as seen in Fig. 2. The latch b is engaged with the latch O by a stud, e, on the latch b, adapted to enter one of the two holes $f$ $g$ in the latch O, the stud more clearly seen in Fig. 4. The latch $b$ is elastic, so as to hold the stud in either of the holes into which it may enter when the said latch $b$ is turned into either one of the said two positions. When it is engaged in the lower position—that is, with the hole $f$ of the latch O—the turning of the latch O to disengage the shoulder S and release the shutter brings the nose $d$ of the latch $b$ into the path of the shoulder S, and so that after escaping from the nose of the latch O the shutter will be instantly turned, and the shoulder S, coming into contact with the nose $d$ of the latch $b$, will interrupt the rotation of the shutter while the opening N is coincident with the exposure-opening, as seen in Fig. 2, and will there remain until the latch $b$ is released.

The operation of the latch O to release the shoulder having been made by the follower U, as before described, the follower being released from the power which moved it, will permit the latch O to turn under the action of its spring T, and which movement will disengage the latch $b$ from the shoulder S and permit the shutter to complete its rotation and close the opening. Under this arrangement the operator takes the bulb U in his hand, and when ready for exposure compresses the bulb, which instantly brings the opening in the shutter to the point for exposure, and there holds it until in his own judgment the exposure has been sufficient, then releases the bulb, and instantly the shutter turns to its closed position, from which it is brought back to its place of action by means of the crank G, and so that the shutter will be engaged by the latch O, as in Fig. 1, when the apparatus is ready for another operation. If the exposure is desired to be instantaneous, the latch $b$ is turned to take its nose $d$ out of the path of the shoulder S, as seen in broken lines, Fig. 2. In that position the stud $e$ enters the hole $g$ in the latch O and locks the two in that position, so that when the shutter is released, as before described, it will turn under the action of its spring and cause the opening N in the shutter to instantly pass across the exposure-opening. Then, by simply turning the latch $b$ into or out of the path of the stud $f$, the apparatus is adapted for an indefinite or an instantaneous exposure, as the case may be.

It will be understood that the disks C D, between which the shutter rotates, are made stationary on the instrument, and I prefer this arrangement of the disks C D, as it gives a good support to the shutter and protects it from possible interruption in its work; but they may be omitted, and the shutter supported entirely by its pivot or axis, and so as to work across the exposure-opening.

Instead of making the latching mechanism in two parts, with the nose R on the one part and the nose $d$ on the other part, the latch may be constructed with both noses in the same piece, as seen in Fig. 6. In that case the instantaneous movement would be more difficult to perform, as it will depend upon instantaneous action upon the bulb W or the mechanism by which the latch is turned. I therefore prefer to construct the latch in two parts.

I claim—

1. In a photographic apparatus, a shutter hung upon an axis parallel with the axis of the exposure-opening, the said shutter constructed with an aperture adapted to pass across said exposure-opening, the combination therewith of a spring adapted to impart rotation to said shutter in one direction, the said shutter provided with a stop, S, which rotates with it, and a latching mechanism presenting two noses, R $d$, adapted to alternately engage the said stop S, the one to hold the shutter in its closed position and the other to hold the shutter with its aperture coincident with the exposure-opening, substantially as described.

2. In a photographic apparatus, a shutter hung upon an axis parallel with the axis of the exposure-opening, the said shutter constructed with an aperture adapted to pass across said exposure-opening, the combination therewith of a spring adapted to impart rotation to said shutter in one direction, the said shutter provided with a stop, S, which rotates with it, and two latches, O $b$, the one provided with a nose, R, and the other with a nose, $d$, the said latch $b$ and its nose $d$ adapted to be turned into or from the path of the said stud, substantially as and for the purpose described.

JOHN K. BEACH.

Witnesses:
JOHN E. EARLE,
FRED C. EARLE.